United States Patent [19]

Takada et al.

[11] Patent Number: 4,982,624

[45] Date of Patent: Jan. 8, 1991

[54] HYDRAULIC CONTROL DEVICE FOR AUTOMATIC TRANSMISSION FOR VEHICLE HAVING FRICTION ENGAGING MEANS OPERATIVE IN TWO JUMPING APART SPEED STAGES

[75] Inventors: Mitsuru Takada; Hiroshi Itoh, both of Toyota; Tokuyuki Takahashi, Aichi; Makoto Funahashi, Toyota, all of Japan

[73] Assignee: Toyota Jidosha Kabushiki Kaisha, Toyota, Japan

[21] Appl. No.: 388,612

[22] Filed: Aug. 2, 1989

[30] Foreign Application Priority Data

Aug. 2, 1988 [JP] Japan ............................ 63-192965
Nov. 2, 1988 [JP] Japan ............................ 63-278346

[51] Int. Cl.⁵ .................... B60K 41/22; B60K 41/24; F16H 59/70
[52] U.S. Cl. ............................................ 74/869; 74/868
[58] Field of Search ................................ 74/868, 869

[56] References Cited

U.S. PATENT DOCUMENTS 3,896,685  7/1975  Shellman ..................... 74/869 X
4,106,369  7/1978  Taga ............................ 74/869
4,719,822  1/1988  Monsawa ..................... 74/868 X
4,843,920  7/1989  Hayasales et al. ........... 74/869

FOREIGN PATENT DOCUMENTS 0058419  8/1982  European Pat. Off. ........... 74/869

*Primary Examiner*—Leslie A. Braun
*Assistant Examiner*—Khoi Q. Ta
*Attorney, Agent, or Firm*—Oblon, Spivak, McClelland, Maier & Neustadt

[57] ABSTRACT

For an automatic transmission for a vehicle such as an automobile having a first friction engaging means such as a clutch which is switched over between engagement and disengagement between two adjacent speed stages such as the third speed stage and the fourth speed stage and a second friction engaging mechanism such as a brake which is engaged at two spaced apart jumping apart speed stages such as the fourth speed stage under D range and the second speed stage under S range, a hydraulic control device switches over such two friction engaging means by a first shift valve for three speed stages such as the fourth, third and second speed stages with a help of second shift valve for switching over the second speed stage and the third speed stage. A drain port of the first shift valve is supplied with a hydraulic pressure from an S port of a manual shift valve through the second shift valve.

3 Claims, 8 Drawing Sheets

| RANGE | SPEED STAGE | | FIRST SOLENOID (400) | SECOND SOLENOID (410) | THIRD SOLENOID (420) | C1 (38) | C2 (40) | C3 (42) | C4 (44) | B1 (46) | B2 (48) | F1 (34) | F2 (36) | REMARKS |
|---|---|---|---|---|---|---|---|---|---|---|---|---|---|---|
| R | ALLOWED | | | | ○ | | | ○ | | | ○ | | | |
| | INHIBITED | | | | | | | | | | | | | ABOVE A PREDETERMINED SPEED |
| D | 1st | | ○ | | | ○ | | | | | | | | |
| | 2nd | | ○ | ○ | ○ | ○ | | | | | | | ○ | |
| | 3rd | | | | ○ | ○ | ○ | | ○ | | | ○ | ○ | |
| | 4th | | | ○ | | ○ | ○ | | | ○ | | ○ | | |
| S | 1st | | ○ | ○ | | ○ | | ○ | ○ | | | | ○ | |
| | 2nd | | ○ | | | ○ | ○ | | ○ | | | ○ | ○ | |
| | 3rd | | | ○ | | ○ | ○ | | ○ | | | ○ | | |
| | (3rd) | | | | | ○ | | | ○ | ○ | | ○ | | WHEN SOLENOID VALVE FAILED |
| L | 1st | | ○ | | | ○ | | | ○ | ○ | | ○ | ○ | |
| | 2nd | | ○ | | | ○ | ○ | | ○ | ○ | | | ○ | |
| | (2nd) | | | | | ○ | | | | | ○ | | ○ | WHEN SOLENOID VALVE FAILED |

D RANGE 3RD SPEED STAGE

D RANGE 4TH SPEED STAGE

S RANGE 2ND SPEED STAGE

HYDRAULIC CONTROL DEVICE FOR AUTOMATIC TRANSMISSION FOR VEHICLE HAVING FRICTION ENGAGING MEANS OPERATIVE IN TWO JUMPING APART SPEED STAGES

BACKGROUND OF THE INVENTION

1. Field of the Invention

The present invention relates to a hydraulic control device for an automatic transmission for a vehicle such as an automobile, and more particularly, to a hydraulic control device for such an automatic transmission having two parallelly arranged input clutches which are selectively engaged or disengaged in providing a plurality of speed stages.

2. Descriptions of the Prior Art

The hydraulically operated automatic transmission for a vehicle such as an automobile generally includes a hydraulically operated input clutch which is sometimes called a forward clutch and which, when engaged, connects the speed stage shifting gear mechanism of the transmission to a rotational power input member therefor which is generally a rotational output member of the fluid torque converter forming an power inlet portion of the automatic transmission. Such a forward clutch is engaged to provide all forward speed stages available by the transmission by a hydraulic pressure supplied thereto under the control of the manual shift valve when it is shifted to any one of forward drive ranges such as the so-called D range, S range, and L range. The manually operated shift valve generally never fails to provide a hydraulic pressure to the forward clutch when it is shifted to either one of the forward drive ranges. Therefore, it is generally improbable that the vehicle equipped with such a hydraulically operated automatic transmission is disabled to drive forward due to non engagement of the forward clutch.

In Japanese Patent Application No. 62-195471 filed on Aug. 5, 1987 and laid open to public on Feb. 13, 1989, two of the inventors of the present invention have proposed an automatic transmission for a vehicle such as an automobile in which a speed stage shifting mechanism includes two parallel arranged input clutches and is adapted so that a first one of the two input clutches is engaged when it provides a first speed stage, a second speed stage and a third speed stage, whereas a second one of the two input clutches is engaged when it provides the third speed stage and a fourth speed stage. Therefore, with regard to the two input clutches there exist three conditions for forward driving of the vehicle that the first clutch only is engaged, the first and the second clutch are both engaged, and the second clutch only is engaged. In other words, the switching over of the two clutches is not an alternative selection. In order to operate such a transmission mechanism automatically, provided that the clutches are of a hydraulically operable type, normally at least two automatically operable hydraulic pressure switching over valves would be required.

On the other hand, when a certain friction engaging means such as a brake incorporated in the automatic transmission is adapted to be engaged in a certain speed stage such as the fourth speed stage under a certain vehicle operating condition such as normal engine driving and further to be engaged in another speed stage different more than one speed stage from said certain speed stage such as the second speed stage under another vehicle operating condition such as engine braking, the switching over of supply and exhaust of hydraulic pressure to and from said certain friction engaging means would not be available by a certain shift valve which switches over speed stages between said certain speed stage such as the fourth speed stage and a speed stage directly adjacent said certain speed stage such as the third speed stage or another certain valve which switches over speed stages between said another speed stage such as the second speed stage and a speed stage directly adjacent said another speed stage such as the third speed stage.

SUMMARY OF THE INVENTION

In view of the above-mentioned circumstances related with the particular type automatic transmission and the general limits in simplifying the hydraulic control devices for the automatic transmissions, it is the object of the present invention to provide a hydraulic control device which can control a friction engaging means for the above-mentioned duplicate operations in an automatic transmission of the above-mentioned type in a highly rationalized construction.

According to the present invention, the above-mentioned object is accomplished by a hydraulic control device for an automatic transmission for a vehicle such as an automobile, wherein said automatic transmission has a first friction engaging means adapted to be engaged or disengaged for switching over speed stages between a certain speed stage and a speed stage on a higher side of said certain speed stage, and a second friction engaging means adapted to be engaged for providing a speed stage on a higher side of said certain speed stage under a certain manual shift range and to be engaged for providing a speed stage on a lower side of said certain speed stage under another manual shift range different from said certain manual shift range, comprising:

a first shift valve for controlling supply and exhaust of a hydraulic pressure to and from said first friction engaging means for switching over speed stages between said certain speed stage and said speed stage on a higher side of said certain speed stage and for controlling supply and exhaust of a hydraulic pressure to and from said second friction engaging means, said first shift valve having a drain port for exhausting a hydraulic pressure from said second friction engaging means, and a second shift valve adapted to be shifted between shift positions for switching over speed stages between said certain speed stage and said speed stage on a lower side of said certain speed stage and adapted to be supplied with a hydraulic pressure from a manual shift valve under said another manual shift range, said second shift valve transmitting said hydraulic pressure from said manual shift valve to said drain port of said first shift valve for said second friction engaging means when said second shift valve is shifted to a position thereof for setting up said speed stage on the lower side of said certain speed stage.

According to the above-mentioned construction the hydraulic pressure control device can control said first and second friction engaging means of the above-mentioned operation characteristics by a single shift valve.

In the above-mentioned structure, said first friction engaging means may be an input clutch to be engaged for providing said certain speed stage and said speed stage on a higher side of said certain speed stage, and said second friction engaging means may be a brake to be engaged for providing said speed stage on a higher side of said certain speed stage under a D range and to be engaged for providing said speed stage on a lower side of said certain speed stage under an S range.

According to a more detailed embodiment, the above-mentioned hydraulic pressure control device may more desirably be applied to such an automatic transmission which has a speed stage shifting mechanism including parallelly arranged first and second input clutches and a brake and adapted to selectively engage said first and second input clutches and said brake in three ways of engaging said first and second input clutches with said brake being disengaged to provide said certain speed stage, engaging said second input clutch and said brake with said first input clutch being disengaged to provide said speed stage on a higher side of said certain speed stage, and engaging said first input clutch and said brake with said second input clutch being disengaged to provide said speed stage on a lower side of said certain speed stage, said first friction engaging means being said second input clutch and said second friction engaging means being said brake, wherein said first shift valve may have an input port to be supplied with an input hydraulic pressure under a D range, a first output port connected with said second input clutch, a second output port connected with said brake and a drain port and adapted to be switched over between a first shift position of connecting said first output port thereof with said input port thereof on the one hand while connecting said second output port thereof with said drain port thereof on the other hand and a second shift position of connecting said first output port thereof with said drain port thereof on the one hand while connecting said second output port thereof with said input port thereof on the other hand; and the hydraulic control device may further comprise a second shift valve having a first input port to be supplied with an input hydraulic pressure under the D range, a second input port to be supplied with a hydraulic pressure under an S range, an output port connected with said first input clutch, a brake port and a drain port and adapted to be switched over between a first shift position of connecting said output port thereof with said first input port thereof on the one hand while connecting said brake port thereof with said drain port thereof on the other hand and a second shift position of connecting said output port thereof with said drain port thereof on the one hand while connecting said brake port thereof with said second input port thereof, and a passage means for connecting said drain port of said first shift valve with said brake port of said second shift valve.

BRIEF DESCRIPTION OF THE DRAWINGS

In the accompanying drawings.

DESCRIPTION OF THE PREFERRED EMBODIMENTS

In the following the invention will be described in detail with respect to some preferred embodiments thereof with reference to the accompanying drawings.

Figures 1, 2:
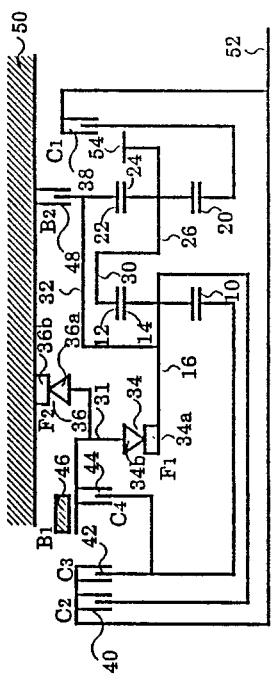
FIG. 1 is a schematic illustration of a planetary gear type speed change device for an automatic transmission having substantially the same speed shift gear mechanism as that disclosed in the above-mentioned Japanese patent application to which the hydraulic control device according to the present invention is applicable.
FIG. 2 is a table showing combinations of energization of the solenoid valves and engagement of the clutches and brakes for setting up the respective speed stages.

Referring to FIG. 1, the speed stage shifting mechanism herein shown comprises a first planetary gear mechanism having a first sun gear 10, a first ring gear 12 coaxial with said first sun gear 10, a first planetary pinion 14 meshing with said first sun gear 10 and said first ring gear 12, and a first carrier 16 rotatably supporting said first planetary pinion 14, and a second planetary gear mechanism having a second sun gear 20, a second ring gear 22 coaxial with said second sun gear 20, a second planetary pinion 24 meshing with said second sun gear 20 and said second ring gear 22, and a second carrier 26 rotatably supporting said second planetary pinion 24. The first ring gear 12 is connected with the second carrier 26 by a connecting member 30. The first carrier 16 is connected with the second ring gear 22 by a connecting member 32.

A first one way clutch 34 and a second one way clutch 36 are provided in series between a housing 50 and the first carrier 16 which is also connected with the second ring gear 22 by the connecting member 32. The first one way clutch 34 is closer to the first carrier 16 and the second one way clutch 36 is closer to the housing 50. In more detail, the first one way clutch 34 has an inner race 34a connected with the first carrier 16 and an outer race 34b connected via a connecting member 31 with an inner race 36a of the second one way clutch which also has an outer race 36b connected with the housing 50. The first one way clutch 34 is engaged when the outer race 34b would rotate relative to the inner race 34a in in a first rotational direction and slips when the inner race 34a rotates relative to the outer race 34b in a second direction opposite to said first direction. Similarly, the second one way clutch 36 is engaged when the inner race 36a would rotate relative to the outer race 36b in said first direction and slips when the inner race 36a rotates relative to the outer race 36a in said second direction.

The second carrier 26 is connected with an annular gear member 54 which operates as an output rotational member of this speed stage shifting mechanism.

A first clutch 38 is provided between the second sun gear 20 and an input shaft 52 for selectively connecting these two members with one another. A second clutch 40 is provided between the first carrier 16 and the input shaft 52 for selectively connecting these two members with one another. A third clutch 42 is provided between the first sun gear 10 and the input shaft 52 for selectively connecting these two members with one another. A fourth clutch 44 is provided between the first sun gear 10 and the connecting member 31 for selectively connecting the sun gear 10 with the outer race 34b of the one way clutch 34 and the inner race 36b of the one way clutch 36.

A first brake 46 is provided between the connecting member 31 and the housing 50 for selectively fixing the connecting member 31 relative to the housing 50. A second brake 48 is provided between the combination of the second ring gear 22 and the first carrier 16 and the housing 50 for selectively fixing the second ring gear 22 and the first carrier 16 with respect to the housing 50.

The manner of providing a first speed stage, a second speed stage, a third speed stage (direct connection stage), a fourth speed stage (overdrive stage) and a reverse stage is shown in Table 1 and FIG. 2. In Table 1 and FIG. 2 a circle (O) indicates that the corresponding clutch, brake or one way clutch is engaged in engine drive state, and in Table 1 a circle in parentheses ((O)) indicates that the corresponding clutch or brake is engaged to provide the corresponding speed stage with the effect of engine braking.

When the ratio of the number of gear teeth of the first ring gear 12 to that of the first sun gear 10 is $r_1$, and the ratio of the number of gear teeth of the second ring gear 22 to that of the second sun gear 20 is $r_2$, speed change gear ratios at the respective speed stages are as shown in Table 2.

Figure 3:
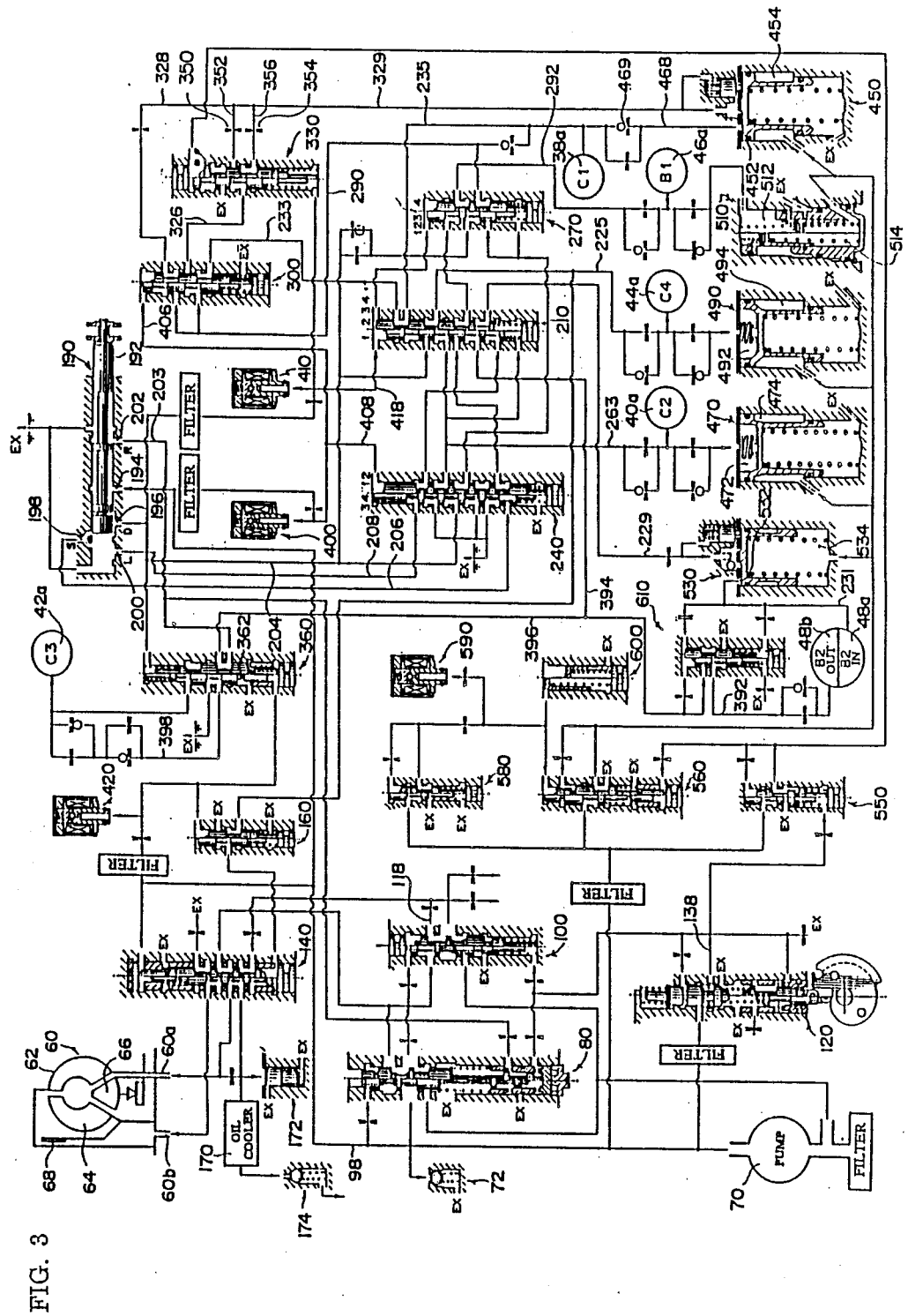
FIG. 3 is a diagram showing an embodiment of a hydraulic control device for an automatic transmission for a vehicle according to the present invention.

The first clutch 38, the second clutch 40, the third clutch 42, the fourth clutch 44, the first brake 46 and the second brake 48 are all of a hydraulically operating type having, as shown in FIG. 3, hydraulic pressure chambers 38a, 40a, 42a, 44a, 46a and 48a plus 48b, respectively, and are adapted to be engaged when a hydraulic pressure is supplied to the hydraulic pressure chambers and are disengaged when the hydraulic pressure has been exhausted from the hydraulic pressure chambers. The supply and the exhaust of the hydraulic pressure to and from these hydraulic pressure chambers are carried out by a hydraulic control device such as shown in FIG. 3.

The input shaft 52 of the above-mentioned planetary gear type speed change device is drivingly connected with a motor such as an internal combustion engine not shown in the figure via a fluid torque converter 60 such as shown in FIG. 3.

The fluid torque converter 60 is of a three elements two phases type comprising a pump impeller 62 drivingly connected with an output member of the motor, a turbine rotor 64 drivingly connected with the input shaft 52 of the planetary gear type speed stage shifting mechanism, and a stator 66 rotatable only in one direction. The fluid torque converter 60 further comprises a lock-up clutch 68 which is engaged to connect the pump impeller 62 directly with the turbine rotor 64 when a hydraulic pressure is supplied to its port 60a and is disengaged when a hydraulic pressure is supplied to its port 60b. The supply of hydraulic pressure to the ports 60a and 60b is carried out by the hydraulic control device shown in FIG. 3.

The outline of the oil hydraulic control device shown in FIG. 3 will now be described with further reference to FIGS. 4-9 with respect to the operations in the D range and the S range and the S range.

The oil hydraulic control device comprises a pump 70 which takes in an operating hydraulic fluid such as an oil from a reservoir not shown in the figure and supplies the hydraulic fluid to a primary regulator valve 80 generally called a line pressure control valve and also to a throttle valve 120. The maximum value of the hydraulic pressure supplied by the pump 70 to the primary regulator valve 80 is restricted by a pressure relief valve 72.

The throttle valve 120 provides in a passage 138 a hydraulic pressure which varies in accordance with the load on the engine and is generally called a throttle pressure.

The primary regulator valve 80 is supplied with the throttle pressure and a reverse boost pressure and provides in a passage 98 the line pressure which generally increases along with increase of the throttle opening and a hydraulic pressure for a secondary regulator valve 100 generally called a converter pressure control valve.

The secondary regulator valve 100 is supplied with the throttle pressure and provides a converter pressure (lubricating oil pressure) in a passage 118. The line pressure in the passage 98 is supplied to a port 194 of a manual valve 190. The manual valve 190 has a spool 192 adapted to be operated by a hand of a driver and selectively provides the line pressure supplied to the port 194 at a D port 196 in the so-called D range, also at an S port 198 in the so-called S range, further at an L port 200 in the so-called L range, and at an R port 202 in the so-called R range.

The line pressure supplied to the D port 196 is conducted through a passage 204 to a D port 214 of a 1-2 shift valve 210, a D port 246 of a 2-3 shift valve 240, and a D port 274 of a 3-4 shift valve 270. The line pressure supplied to the S port 198 is conducted through a passage 206 to an S port 248 of the 2-3 shift valve 240. The line pressure supplied to the L port 200 is conducted through a passage 208 to an L port 250 of the 2-3 shift valve 240. The line pressure supplied to the R port 202 is conducted through a passage 203 to a reverse inhibit valve 360.

Figure 4:
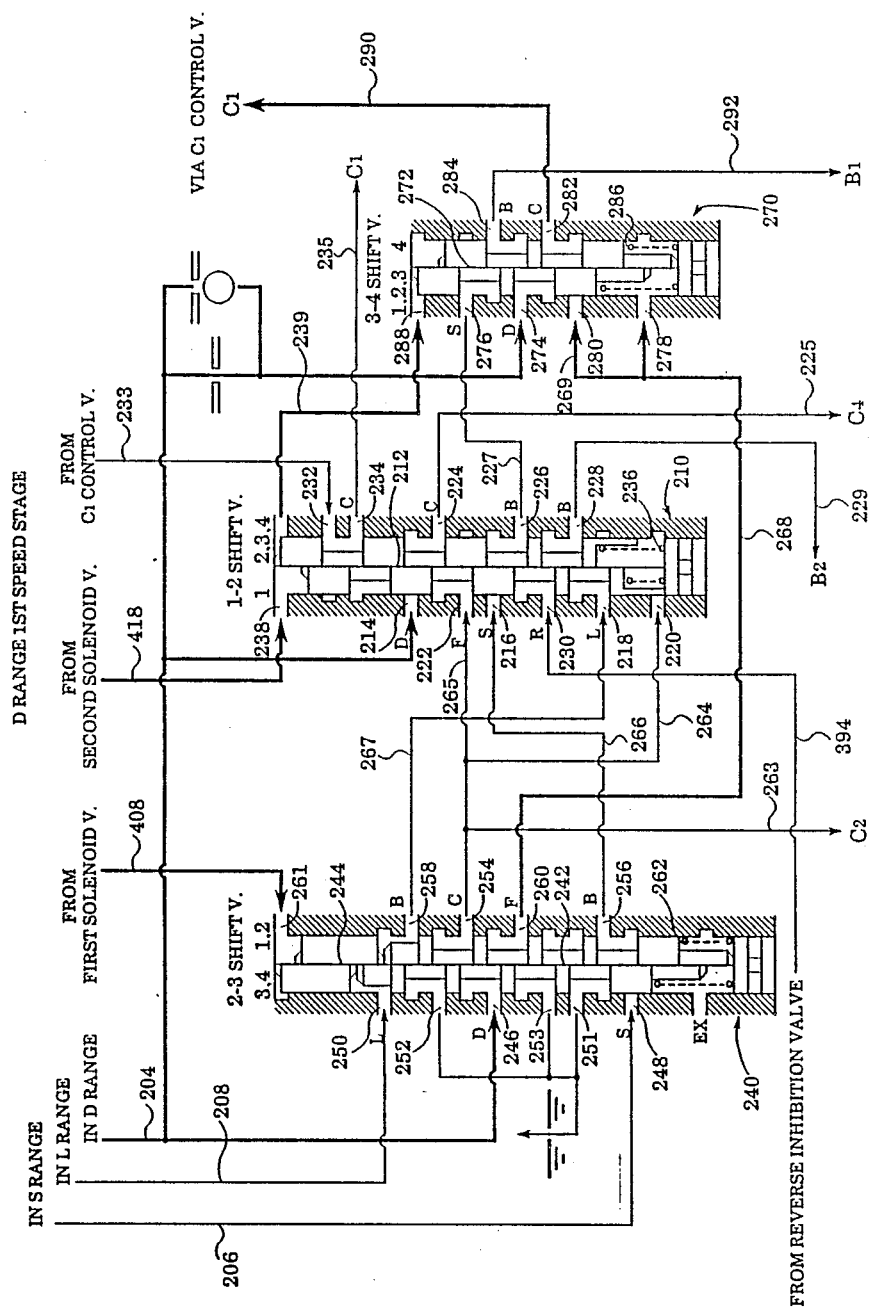
FIGS. 4 through 9 are diagrams showing the essential portion of the hydraulic control device shown in FIG. 3 in the conditions operating at respective speed stages.

As shown in more detail in FIG. 4 the 2-3 shift valve 240 comprises a spool element 242 and a plug element 244, and in addition to the above-mentioned ports further comprises drain ports 251, 252 and 253, a clutch port 254, brake ports 256 and 258 and a fail safe port 260. When a hydraulic pressure is supplied to a control port 261, the plug element 244 and the spool element 242 are shifted downward in the figure to a "1,2" shift position as shown in the right half portion thereof by overcoming the spring force of a compression coil spring 262 so as to connect the clutch port 254 with the drain port 252, the brake port 256 with the S port 248, the brake port 258 with the L port 250, and the fail safe port 260 with the D port 246, respectively. In contrast, when no hydraulic pressure is supplied to the control port 261, the plug element 244 and the spool element 242 are shifted upward in the figure to a "3,4" shift position as shown in the left half portion thereof by the spring force of the compressing coil spring 262 so as to connect the clutch port 254 with the D port 246, and the brake ports 256 and 258 and the fail safe port 260 with the drain ports 251, 252 and 252, respectively. The supply of the hydraulic pressure to the control port 261 is controlled by a first solenoid valve 400.

The clutch port 254 is connected through a passage 263 with the hydraulic pressure chamber 40a of the second clutch 40 and an accumulator chamber 472 of an accumulator 470 for the clutch $C_2$. The clutch port 254 is also connected through a passage 264 with a hold port 220 of the 1-2 shift valve 210, and also through a passage 265 with a fail safe port 222 of the 1-2 shift valve 210. The fail safe port 222 also has a concept of drain port because it is connectable to drain through ports 252 and 254 of the 2-3 shift valve. The brake port 256 is connected through a passage 266 with the S port 216 of the 1-2 shift valve 210. The brake port 258 is connected through a passage 267 with the L port 218 of the 1-2 shift valve 210. The fail safe port 260 is connected through a passage 268 with a hold port 278 of the 3-4 shift valve 270 and also connected through a passage 269 with a drain port 280 of the 3-4 shift valve 270.

As also shown in FIG. 4, the 1-2 shift valve 210 comprises a spool element 212, and in addition to the above-mentioned ports further comprises a clutch port 224, brake ports 226 and 228, an R port 230, a port 232 and a clutch port 234. When a hydraulic pressure is supplied to a control port 238 the spool element 212 is shifted downward in the figure as shown in the left half portion thereof to a "1" shift position by overcoming the spring force of a compression coil spring 236 so as to connect the clutch port 224 with the fail safe port 222, the brake port 226 with the R port 230, and the brake port 228 with the L port 218, while isolating the port 232 from the clutch port 234. In contrast, when no hydraulic pressure is supplied to the control port 238, the spool element 212 is shifted upward in the figure as shown in the right half portion thereof to a "2,3,4" shift position by the spring force of the compression coil spring 236 so as to connect the clutch port 224 with the D port 214, the brake port 226 with the S port 216, the brake port 228 with the R port 230, and the port 232 with the clutch port 234.

The supply of the hydraulic pressure to the control port 238 is controlled by a second solenoid valve 410. The control port 238 is connected through a passage 239 with a control port 288 of the 3-4 shift valve 270.

The clutch port 224 is connected through a passage 225 with the hydraulic pressure chamber 44a of the fourth clutch 44 and an accumulator chamber 492 of an accumulator 490 for the clutch $C_4$. The brake port 226 is connected through a passage 227 with an S port 276 of the 3-4 shift valve 270. The brake port 228 is connected through a passage 229 with an accumulator chamber 532 of an accumulator 530 for the brake $B_2$, and is further connected through a passage 231 with the inside hydraulic pressure chamber 48a of the second brake 48. The port 232 is connected through a passage 233 with a port of a $C_1$ control valve 300. The clutch port 234 is connected through a passage 235 with the hydraulic chamber 38a of the first clutch 38.

Also referring to FIG. 4, the 3-4 shift valve 270 comprises a spool element 272, and in addition to the above-mentioned ports further comprises a clutch port 282 and a brake port 284. When no hydraulic pressure is supplied to the hold port 278 while a hydraulic pressure is supplied to the control port 288, the spool element 272 is shifted downward in the figure to a "4" shift position as shown in the right half portion thereof by overcoming the spring force of a compression coil spring 286 so as to connect the clutch port 282 with the drain port 280, and the brake port 284 with the D port 274. In contrast, when a hydraulic pressure is supplied to the hold port 278, or when no control pressure is supplied to the control port 288, the spool element 272 is shifted upward in the figure to a "1,2,3" shift position as shown in the left half portion thereof by the oil pressure supplied to the port 278 and/or the spring force of the compression coil spring 286 so as to connect the clutch port 282 with the D port 274, and the brake port 284 with the S port 276.

The clutch port 282 is connected through a passage 290 with the $C_1$ control valve 300. The brake port 284 is connected through a passage 292 with the oil hydraulic pressure chamber 46a of the first brake 46 and an accumulator chamber 512 of an accumulator 510 for the brake $B_1$.

The first solenoid valve 400 and the second solenoid valve 410 are normally open type valves which open their ports when not energized and close their ports when energized. The manner of energization of these solenoid valves is shown in FIG. 2 in relation with the speed stages to be set up. In FIG. 2 a circle (O) indicates energization of the corresponding solenoid valve.

The first solenoid valve 400 is connected through a passage 408 with the control port 261 of the 2-3 shift valve 240 and is also connected through a passage 406 with a port of the C1 control valve 300.

The second solenoid valve 410 is connected through a passage 418 with the control port 238 of the 1-2 shift valve 210, and is also connected through a passage 239 with the control port 288 of the 3-4 shift valve 270.

Therefore, when the solenoid valve 400 is energized the control port 261 of the 2-3 shift valve 240 is supplied with a hydraulic pressure, and when the solenoid valve 410 is energized the control port 238 of the 1-2 shift valve 210 and also the control port 288 of the 3-4 shift valve 270 are supplied with a hydraulic pressure.

The $C_1$ control valve 300 controls switching over of the first clutch 38 by switching over the connection of the passage 290 with passages 233, 326 and 328 according to whether the speed stage to be set up requires engagement of the first clutch 38 or not.

The passage 328 is connected through a passage 329, an accumulator chamber 452 of an accumulator 450 for the clutch $C_1$, a passage 468 and a one way valve 469 with the hydraulic pressure chamber 38a of the first clutch 38. The passage 326 is connected with a port of a 4-3 control valve 330.

The 4-3 control valve 330 controls the timing of the engagement of the first clutch 38 in speed stage shifting between the third speed stage and the fourth speed stage by connecting the passage 326 with either a passage 352 or a passage 356 incorporating an orifice 350 or 354 having each particular throttling ratio so as to switch over the rate of supply of hydraulic pressure to the hydraulic pressure chamber 38a. The passages 352 and 356 are both connected with a passage 329 which is connected through the accumulator chamber 452, the passage 468 and the one way valve 469 with the hydraulic chamber 38a of the first clutch 38.

The reverse inhibit valve 360 is supplied with the line pressure from the R port 202 of the manual valve 190 through a passage 203, and is switched over according to opening or closing of the third solenoid valve 420 so as to be at an inhibit position where a spool 362 is shifted up as shown in a left half portion thereof when the vehicle is running forward at a speed greater than a predetermined value and to be in a non inhibit position where the spool element 362 is shifted down as shown in the right half portion thereof during other operating conditions while allowing the line pressure from the passage 203 to flow to the passage 398 toward the hydraulic pressure chamber 42a of the third clutch 42, to the passages 396 and 394 toward the R port 230 of the 1-2 shift valve 210, and also to the passage 396, a $B_2$ sequence valve 610 and a passage 392 toward the outside hydraulic pressure chamber 48b of the second brake 48.

The $B_2$ sequence valve 610 operates in response to the hydraulic pressure in the inside hydraulic pressure chamber 48a of the second brake 48 so as to connect the passage 396 with the passage 392 so that the outside hydraulic pressure chamber 48b is supplied with the hydraulic pressure when the oil pressure in the inside hydraulic pressure chamber 48a is greater than a predetermined value.

Accumulators 450, 470, 490, 510 and 530 are back pressure control type accumulators having back pressure chambers 454, 474, 494, 514 and 534, respectively. The hydraulic pressure supplied to these back pressure chambers is controlled by a second accumulator control valve 560. The second accumulator control valve 560 is supplied with a duty hydraulic pressure controlled by a duty solenoid valve 590 and the hydraulic pressure from the first accumulator control valve 550 to change its output control pressure. The duty solenoid valve 590 is supplied with a pulse signal having a determinate duty ratio and cyclically opens and closes according to the duty ratio so as to control a modulate hydraulic pressure from a duty control valve 580 according to the duty ratio. The duty hydraulic pressure controlled by the duty solenoid valve 590 for the second accumulator control valve 560 is rectified of its pulses by a duty pressure accumulator 600. The first accumulator control valve 550 is supplied with the throttle pressure from the throttle valve 138 so as to control the oil pressure supplied to the second accumulator control valve 560 and the 4-3 control valve 330 in accordance with the throttle pressure.

The supply of the converter pressure to the ports 60a and 60b of the fluid torque converter 60 is controlled by a lock up relay valve 140. The lock up relay valve 140 is switched over according to a selective supply of an oil pressure from a lock up signal valve 160. The lock up relay valve 140 supplies hydraulic fluid, i.e., oil, toward an oil cooler 170. The hydraulic pressure in the passage including the oil cooler 170 is limited by a cooler bypass valve 172 and a relief valve 174. The lock up signal valve 160 is supplied with an oil pressure from the clutch port 224 of the 1-2 shift valve 210 and is switched over in accordance with on and off of the third solenoid valve 420 so as to supply the hydraulic pressure supplied from the clutch port 224 to the lock up relay valve 140 and to engage the lock up clutch 68 when the third solenoid valve 420 is energized. The third solenoid valve 420 is selectively energized as shown in FIG. 2 for inhibiting engagement of the lock up clutch 68 in the reverse stage where the manual shift valve is shifted to the R range and when the manual shift valve is shifted to the D range.

The operation of the hydraulic control device according to the present invention will now be described principally with respect to the speed stage shifting operation under the D range and the S range with reference to FIGS. 4-9. In FIGS. 4-9 the bold lines indicate that a hydraulic pressure is supplied in those lines in the respective speed stages.

First referring to FIG. 4, the operation in the first speed stage under the D range will be described. When the manual shift valve is set to the D range, the manual shift valve 190 provides the line pressure only at the D port 196.

In the first speed stage the first solenoid valve 400 and the second solenoid valve 410 are both energized, and therefore the control port 261 of the 2-3 shift valve 240, the control port 238 of the 1-2 shift valve 210 and the control port 288 of the 3-4 shift valve 270 are supplied with the hydraulic pressure. Therefore, the plug element 244 and the spool element 242 of the 2-3 shift valve 240 are shifted to the "1,2" shift position shown in the right half portion thereof, and the spool element 212 of the 1-2 shift valve 210 is shifted to the "1" shift position shown in the left half portion thereof. Therefore, the line pressure from the D port 196 of the manual shift valve 190 is supplied through the passage 204, the D port 246 of the 2-3 shift valve 240, the fail safe port 260, and the passage 268 to the hold port 278 of the 3-4 shift valve 270. The 3-4 shift valve 270 is supplied with the hydraulic pressure at the control port 288. However, since the hold port 278 is also supplied with the hydraulic pressure, the spool element 272 is shifted to the "1,2,3" shift position shown in the left half portion thereof by the spring force of the compression coil spring 286. Therefore, the D port 274 is connected with the clutch port 282, and the line pressure from the D port 196 of the manual shift valve 190 is supplied the passage 290, the $C_1$ control valve 300, through the passages 328 and 329, the accumulator chamber 452 of the accumulator 450 for the clutch C1, and the one way valve 469 to the hydraulic pressure chamber 38a of the first clutch $C_1$ which is then engaged. Thus the first speed stage of the D range is set up.

Figure 5:
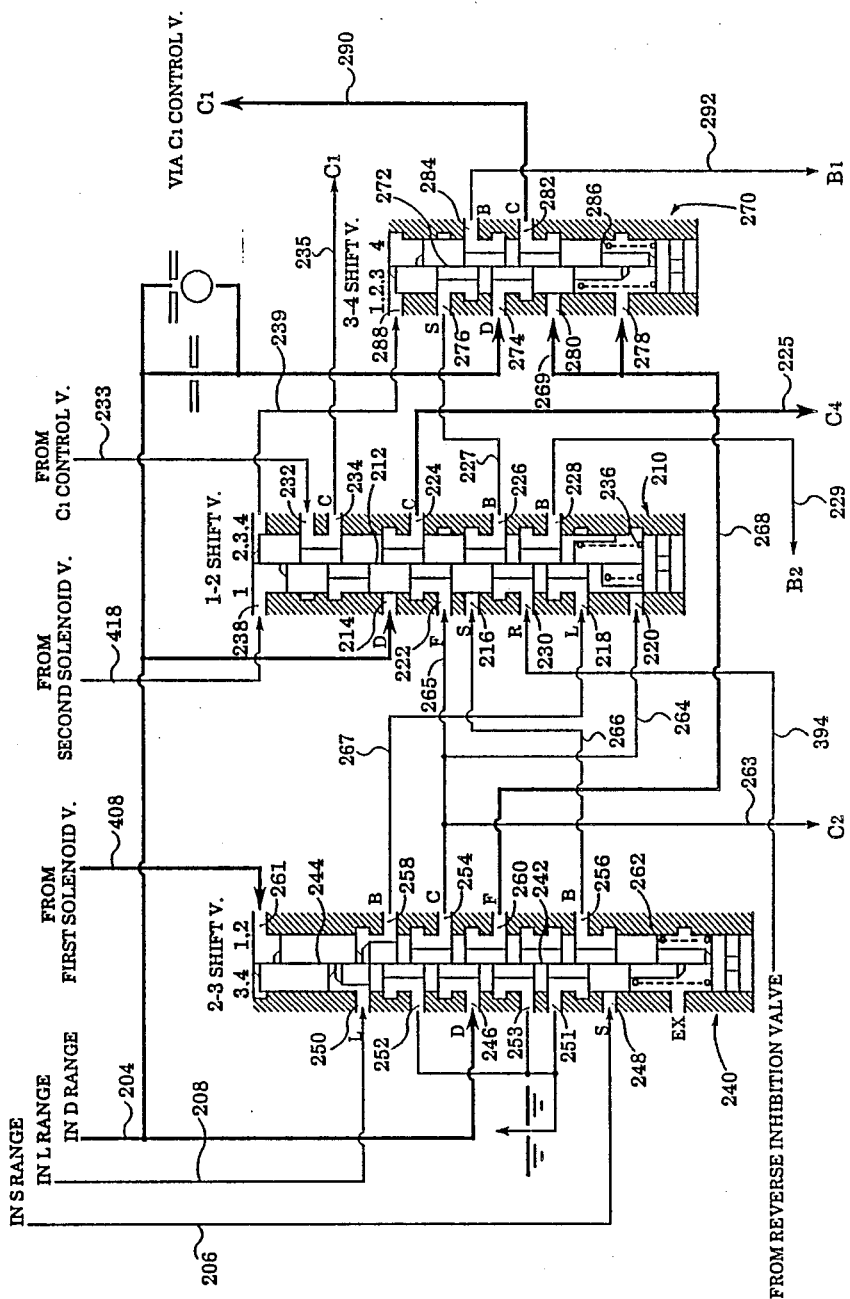

Next, referring to FIG. 5, the second speed stage under the D range will be described. In this speed stage the first solenoid valve 400 is only energized, so that the control port 261 of the 2-3 shift valve 240 only is still supplied with the oil pressure. Therefore, the plug element 244 and the spool element 242 of the 2-3 shift valve 240 remain in the "3,4" shift position, whereas the spool element 212 of the 1-2 shift valve 210 is shifted to the "2,3,4" shift position shown in the right half portion thereof by the spring force of the compression coil spring 236. In the 3-4 shift valve 270 the hydraulic pressure in the control port 288 disappears and the spool element 272 still remains at the "1,2,3" shift portion shown in the left half portion thereof by the hydraulic pressure supplied to the hold port 278 and the spring force of the compression coil spring 286. By the shifting over of the 1-2 shift valve 210 the D port 214 is now connected with the clutch port 224 so that the line pressure from the D port 196 of the manual shift valve 190 is supplied to the passage 225 to the hydraulic pressure chamber 44a of the fourth clutch 44 which is then engaged. Thus the first clutch 38 and the fourth clutch 44 are engaged, thereby setting up the second speed stage of the D range.

Figure 6:
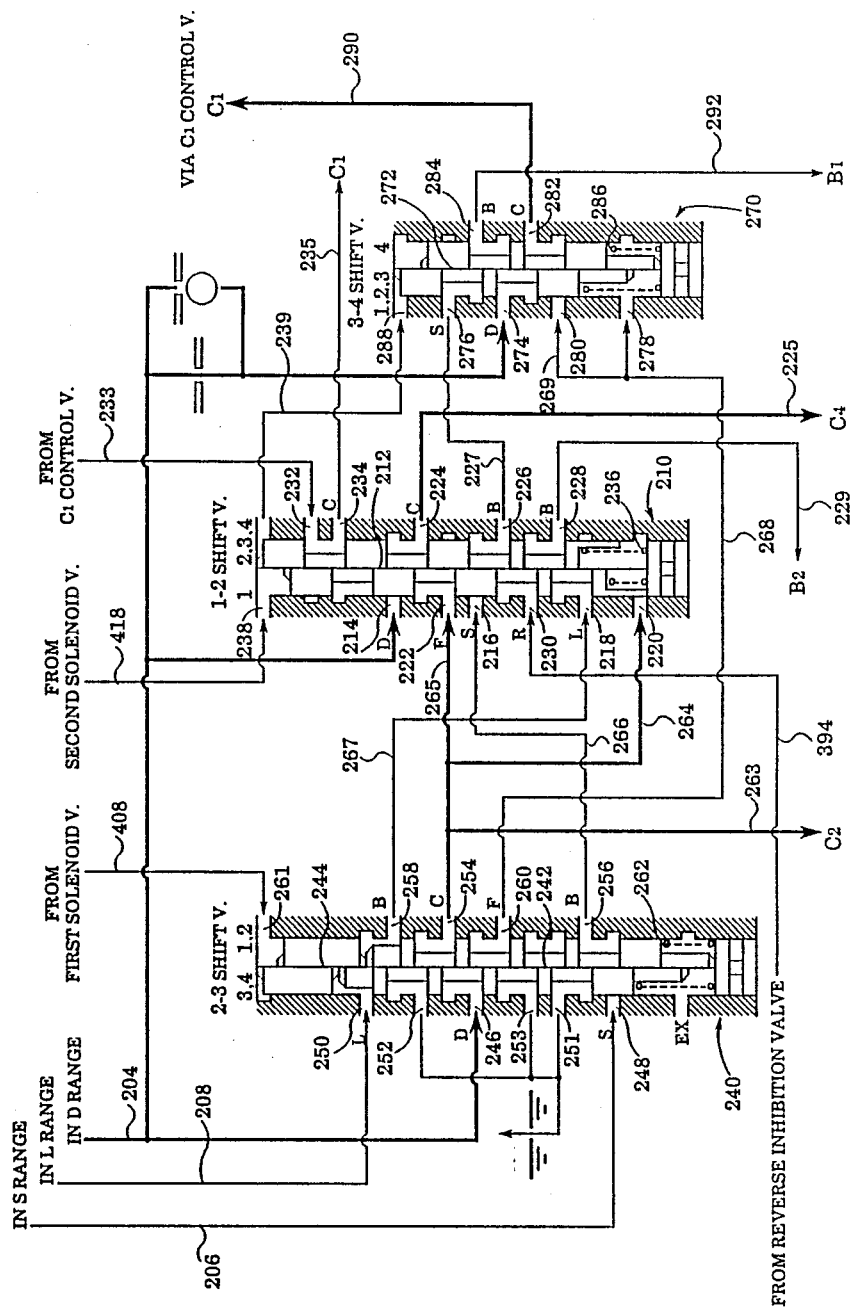

Next, referring to FIG. 6, the third speed stage under the D range will be described. In this speed stage the first solenoid valve 400 and the second solenoid valve 410 are both not energized, so that the control port 238 of the 1-2 shift valve 210 and the control port 261 of the 2-3 shift valve 240 are both not supplied with hydraulic pressure. Therefore, the plug element 244 and the spool element 242 of the 2-3 shift valve 240 are lifted to the "3,4" shift position as shown in the left half portion in the figure by the spring force of the compression coil spring 262, whereby the D port 246 of the 2-3 shift valve 240 is isolated from the fail safe port 260 thereof and is connected with the clutch port 254. Thus the line pressure from the D port 196 of the manual shift valve 190 is conducted through the passage 263 to the hydraulic pressure chamber 40a of the second clutch 40 which is then engaged. In the 3-4 shift valve 270, although the hold port 278 is no longer supplied with the hydraulic pressure, the spool element 272 still remains in the lifted "1,2,3" shift position by the spring force of the compression coil spring 286. In the 1-2 shift valve 210, the spool element 212 remains in the lifted "2,3,4" shift position as in the second speed stage. Therefore, in addition to the first clutch 38 and the fourth clutch 44 the second clutch 40 is now engaged, thereby setting up the third speed stage of the D range.

Figure 7:
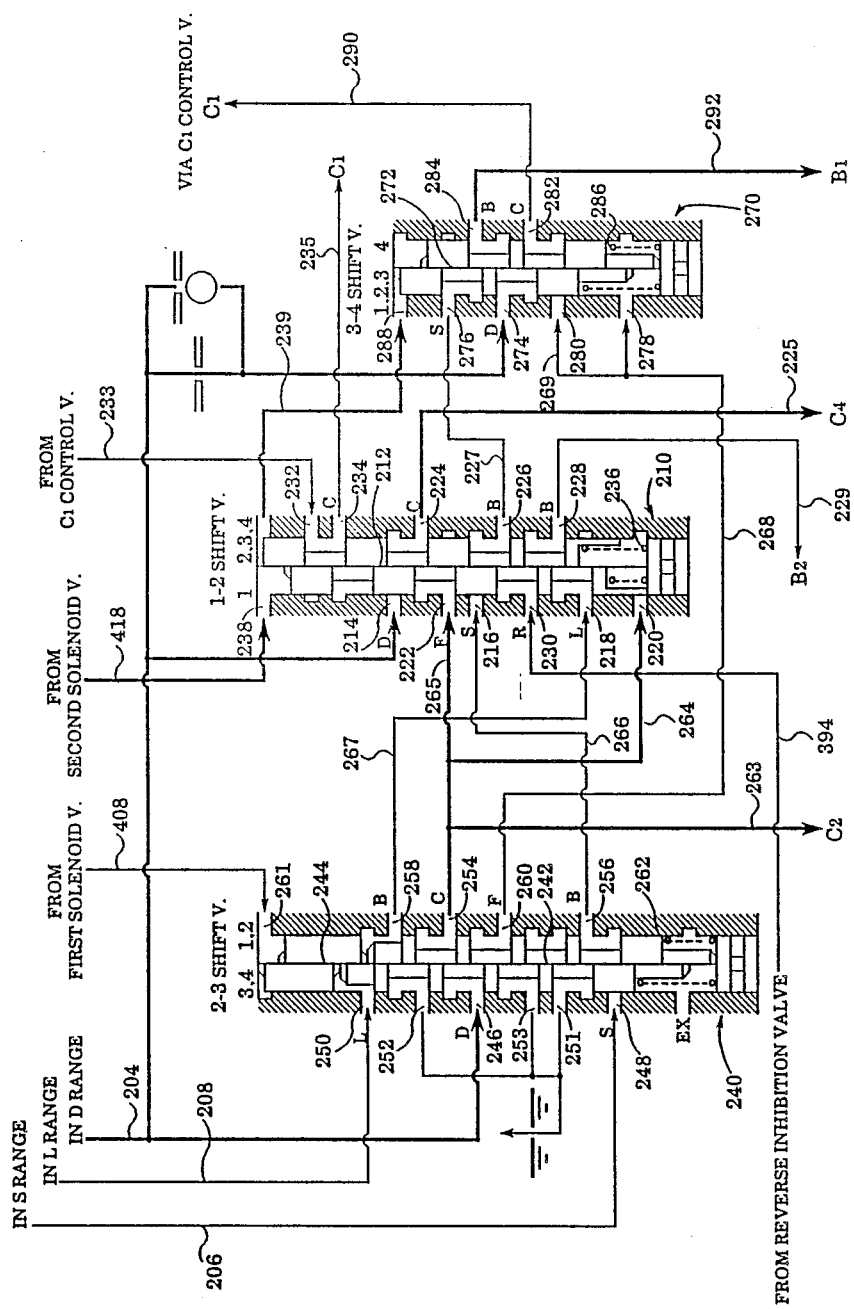

Next, referring to FIG. 7, the fourth speed stage under the D range will be described. In this speed stage the second solenoid valve 410 only is energized. Therefore, the control port 238 of the 1-2 shift valve 210 and the control port 288 of the 3-4 shift valve 270 are supplied with the hydraulic pressure. In the 1-2 shift valve 210 the hold port 220 is supplied with the hydraulic pressure from the clutch port 254 of the 2-3 shift valve 240 through the passage 264. Therefore, in spite of the supply of the hydraulic pressure to the control port 238 the spool element 212 remains in the lifted "2,3,4" shift position shown in the right half portion thereof by the spring force of the compression coil spring 236. However, in the 3-4 shift valve 270, since the hold port 278 is connected through the passage 268 and the fail safe port 260 of the 2-3 shift valve 240 to the drain port 253, the spool element 272 is shifted downward in the "4" shift position by the oil pressure supplied to the control port 288 by overcoming the spring force of the compression coil spring 286. Therefore, the D port 274 is connected with the brake port 284 instead of the clutch port 282 which is now connected to the drain port through the port 280. Thus the hydraulic pressure chamber 38a of the first clutch 38 is now exhausted of the oil pressure, and the first clutch 38 is disengaged. Instead the line pressure is supplied to the hydraulic pressure chamber 46a of the first brake 46 which is now engaged. Therefore, the second clutch 40, the fourth clutch 44 and the first brake 46 are engaged, thereby setting up the overdrive fourth speed stage of the D range.

When the manual shift valve is set to the D range, the manual shift valve 190 provides the line pressure only at the D port 196. At this time the 2-3 shift valve 240 is supplied with the line pressure from the manual shift valve 190 only at the D port 246 thereof. However, when the manual shift valve 190 is shifted to the L range, the manual shift valve 190 provides at its S port 198 and its L port 200 in addition to the D port 196, and in accordance with this in the 2-3 shift valve 240 the line pressure is supplied to its S port 248 and its L port 250 in addition to its D port 246.

Figure 8:
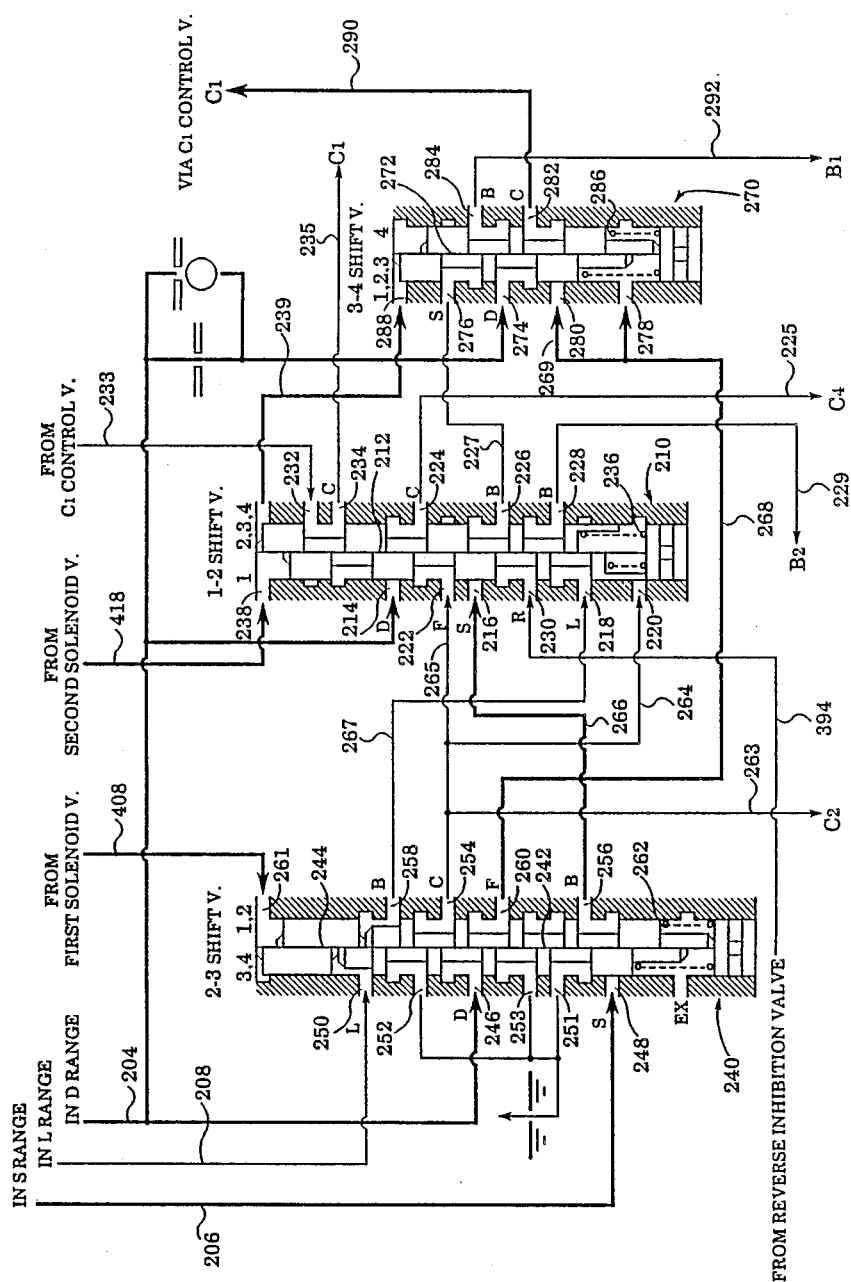

Next, referring to FIG. 8 the first speed stage under the S range will be described. In this state, as in the first speed stage under the D range, the first solenoid valve 400 and the second solenoid valve 410 are both energized, and therefore the control port 261 of the 2-3 shift valve 240, the control port 238 of the 1-2 shift valve 210, and the control port 288 of the 3-4 shift valve 270 are supplied with the hydraulic pressure. Therefore, the 2-3 shift valve 240, the 1-2 shift valve 210 and the 3-4 shift valve 270 are switched over in the respective positions which are the same as in the first speed stage under the D range. Therefore, the hydraulic pressure chamber 38a of the first clutch 38 is supplied with the hydraulic pressure to engage the clutch 38. Since at this time the S port 248 of the 2-3 shift valve 240 is supplied with the line pressure from the manual shift valve 190, this line pressure is transmitted through a brake port 256 and the passage 266 to the S port 216 of the 1-2 shift valve 210. However, since the valve element 212 in the 1-2 shift valve 210 is shifted to the first shift position as shown in the left half portion thereof in the figure, the line pressure is not transmitted further.

Figure 9:
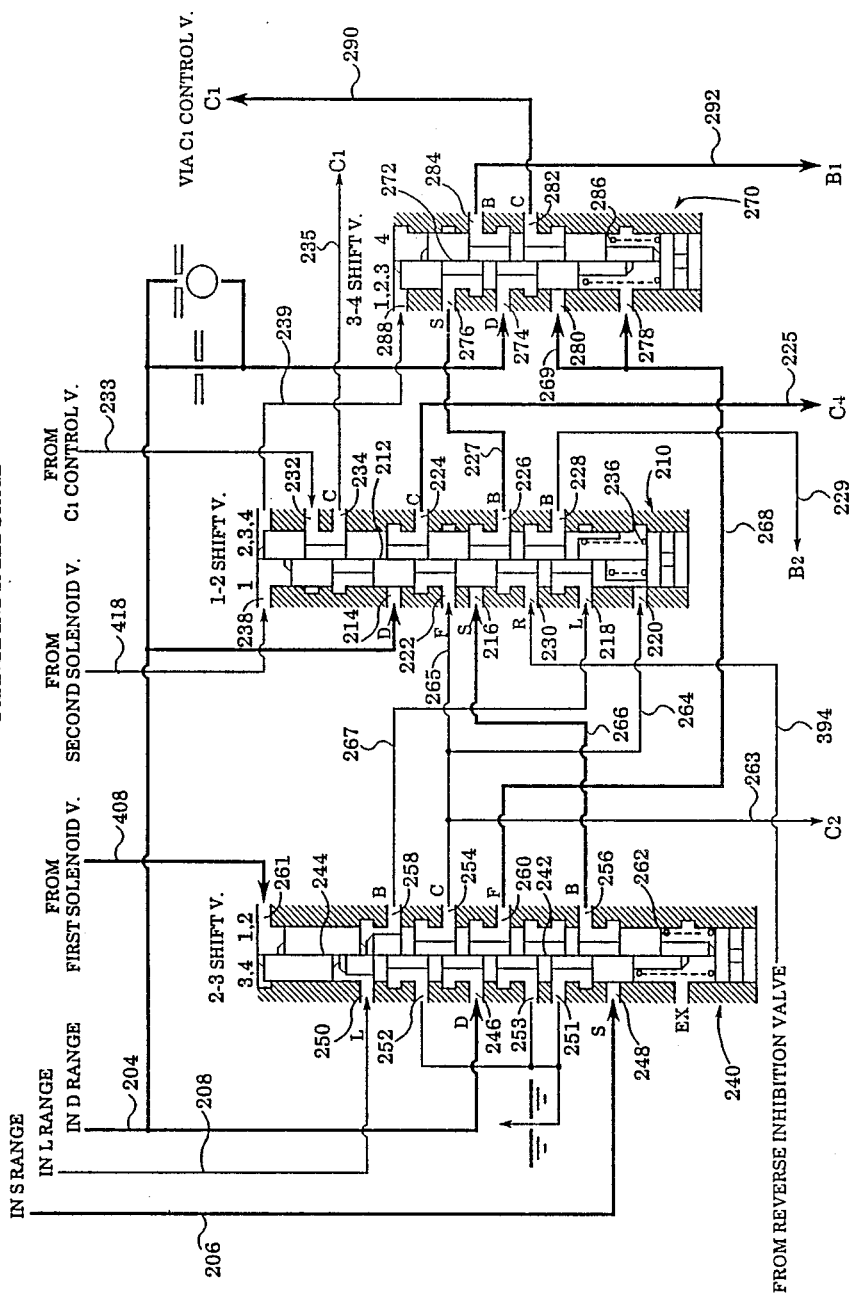

Next, with reference to FIG. 9 the second speed stage under the S range will be described. In this state the first solenoid valve 400 only is energized as in the second speed stage under the L range, and therefore the control port 261 of the 2-3 shift valve 240 is supplied with the hydraulic pressure. Therefore, the 2-3 shift valve 240, the 1-2 shift valve 210 and the 3-4 shift valve 270 are shifted to the respective shift positions which are the same as in the second speed stage under the D range. Therefore, the hydraulic pressure chamber 38a of the first clutch 38 and the hydraulic pressure chamber 44a of the fourth clutch 44 are supplied with the hydraulic pressure, and therefore the first clutch 38 and the fourth clutch 44 are engaged. In this state, since the S port 248 of the 2-3 shift valve 240 is supplied with the line pressure from the manual shift valve 190, this hydraulic pressure is transmitted through the brake port 256 and the passage 266 to the S port 216 of the 1-2 shift valve 210, and further through the brake port 226 and the passage 227 to the S port 276 of the 3-4 shift valve 270 which serves as an exhaust port for the first brake 46 in speed stages other than the present speed stage. Further the hydraulic pressure is transmitted through the brake port 284 and the passage 292 to the hydraulic pressure chamber 46a of the first brake 46, so as to engage the first brake 46. Thus the second speed stage having the engine braking effect is set up. In order to disengage the first brake 46 in the first, the second and the third speed stage under the D range and in the first speed stage under the S range, the hydraulic pressure chamber 46a is exhausted through the S port 276 of the 3-4 shift valve 270. That is, in the first speed stage under the D range the S port 276 is connected through the passage 227, the brake port 226 and the R port 230 of the 1-2 shift valve 210 and the passage 394 to the reverse inhibition valve 360 so as to exhaust the hydraulic pressure chamber 46a. Further in the second speed stage under the D range, the S port 276 is connected through the passage 227, the brake port 226 and the S port 216 of the 1-2 shift valve 210 and the passage 266 to the brake port 256 of the 2-3 shift valve 240, and then is further connected through the S port 248 and the passage 206 to the manual shift valve 190 so as to exhaust the hydraulic pressure chamber 46a. In the third speed stage under the D range, the S port 276 is connected through the passage 227, the brake port 226 and the S port 216 of the 1-2 shift valve 210, the passage 266 and the brake port 256 of the 2-3 shift valve 240 to the drain port 251 so as to exhaust the hydraulic pressure chamber 46a.

In the first speed stage under the S range, the S port 276 is, in the same manner as in the first speed stage under the D range, connected through the passage 227, the brake port 226 and the R port 230 of the 1-2 shift valve 290 and the passage 394 to the reverse inhibition valve 360, so as to exhaust the hydraulic pressure chamber 46a.

Even under the S range, if the vehicle speed is so high as to cause an overrun of the engine, the third speed stage is set up. In this state the hydraulic pressure chamber 46a of the first brake 46 is exhausted through the S port 276 of the 3-4 shift valve 270, the passage 227, the brake port 226 and the S port 216 of the 1-2 shift valve 210, the passage 266, the brake port 256 and the drain port 251 of the 2-3 shift valve 240.

Although the invention has been described in detail with respect to a preferred embodiment thereof, it will be apparent to those skilled in the art that various modifications are possible with respect to the shown embodiment within the scope of the present invention.

TABLE 1

|  | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | O |  |  |  |  | (O) | O | O |
| 2nd Speed Stage | O |  |  | O | (O) |  |  | O |
| 3rd Speed Stage | O | O |  | O |  | O |  |  |
| 4th Speed Stage |  | O |  | O | O |  |  |  |
| Reverse Stage |  |  | O |  | O |  |  |  |

TABLE 2

| | Speed Change Gear Ratio |
|---|---|
| 1st Speed Stage | $(1 + r_2)/r_2$ |
| 2nd Speed Stage | $\{(1 + r_2)/r_2\} - \{1/r_3(1 + r_1)\}$ |
| 3rd Speed Stage | 1 |
| 4th Speed Stage | $1/(1 + r_1)$ |
| Reverse Stage | $-1/r_1$ |

We claim:

1. A hydraulic control device for an automatic transmission for a vehicle such as an automobile, wherein said automatic transmission has a first friction engaging means adapted to be engaged or disengaged for switching over speed stages between a certain speed stage and a speed stage on a higher side of said certain speed stage, and a second friction engaging means adapted to be engaged for providing a speed stage on a higher side of said certain speed stage under a certain manual shift range and to be engaged for providing a speed stage on a lower side of said certain speed stage under another manual shift range different from said certain manual shift range, comprising:

a first shift valve for controlling supply and exhaust of a hydraulic pressure to and from said first friction engaging means for switching over speed stages between said certain speed stage and said speed stage on a higher side of said certain speed stage and for controlling supply and exhaust of a hydraulic pressure to and from said second friction engaging means, said first shift valve having a drain port for exhausting a hydraulic pressure from said second friction engaging means, and a second shift valve adapted to be shifted between shift positions for switching over speed stages between said certain speed stage and said speed stage on a lower side of said certain speed stage and adapted to be supplied with a hydraulic pressure from a manual shift valve under said another manual shift range, said second shift valve transmitting said hydraulic pressure from said manual shift valve to said drain port of said first shift valve for said second friction engaging means when said second shift valve is shifted to a position thereof for setting up said speed stage on the lower side of said certain speed stage.

2. A hydraulic control device according to claim 1, wherein said first friction engaging means is an input clutch to be engaged for providing said certain speed stage and said speed stage on a higher side of said certain speed stage, and said second friction engaging means is a brake to be engaged for providing said speed stage on a higher side of said certain speed stage under a D range and to be engaged for providing said speed stage on a lower side of said certain speed stage under an S range.

3. A hydraulic pressure device according to claim 1, wherein said automatic transmission has a speed stage shifting mechanism including parallelly arranged first and second input clutches and a brake and adapted to selectively engage said first and second input clutches and said brake in three ways of engaging said first and second input clutches with said brake being disengaged to provide said certain speed stage, engaging said second input clutch and said brake with said first input clutch being disengaged to provide said speed stage on a higher side of said certain speed stage, and engaging said first input clutch and said brake with said second input clutch being disengaged to provide said speed stage on a lower side of said certain speed stage, said first friction engaging means being said first input clutch and said second friction engaging means being said brake, and said first shift valve has an input port to be supplied with an input hydraulic pressure under a D range, a first output port connected with said first input clutch, a second output port connected with said brake and a first and a second drain port and adapted to be switched over between a first shift position of connecting said first output port thereof with said input port thereof on the one hand while connecting said second output port thereof with said first drain port thereof on the other hand and a second shift position of connecting said first output port thereof with said second drain port thereof on the one hand while connecting said second output port thereof with said input port thereof on the other hand; said second shift valve having a first input port to be supplied with an input hydraulic pressure under the D range, a second input port to be supplied with a hydraulic pressure under an S range, an output port connected with said second input clutch, a brake port and a first and a second drain port and adapted to be switched over between a first shift position of connecting said output port thereof with said first input port thereof on the one hand while connecting said brake port thereof with said first drain port thereof on the other hand and a second shift position of connecting said output port thereof with said second drain port thereof on the one hand while connecting said brake port thereof with said second input port thereof, and a passage means for connecting said first drain port of said first shift valve with said brake port of said second shift valve.

* * * * *